US012095202B2

(12) United States Patent
Whear

(10) Patent No.: US 12,095,202 B2
(45) Date of Patent: Sep. 17, 2024

(54) MAGNETIC CONNECTOR

(71) Applicant: Exceltec Canada Inc., Laval (CA)

(72) Inventor: Benoit Whear, Laval (CA)

(73) Assignee: EXCELTEC CANADA INC., Laval (CA)

( * ) Notice: Subject to any disclaimer, the term of this patent is extended or adjusted under 35 U.S.C. 154(b) by 358 days.

(21) Appl. No.: 17/639,664

(22) PCT Filed: Sep. 1, 2020

(86) PCT No.: PCT/CA2020/051192
§ 371 (c)(1),
(2) Date: Mar. 2, 2022

(87) PCT Pub. No.: WO2021/042206
PCT Pub. Date: Mar. 11, 2021

(65) Prior Publication Data

US 2022/0294156 A1 Sep. 15, 2022

Related U.S. Application Data

(60) Provisional application No. 62/896,098, filed on Sep. 5, 2019.

(51) Int. Cl.
*H01R 13/62* (2006.01)
*H01R 13/52* (2006.01)

(52) U.S. Cl.
CPC ....... *H01R 13/6205* (2013.01); *H01R 13/521* (2013.01); *H01R 13/5219* (2013.01)

(58) Field of Classification Search
None
See application file for complete search history.

(56) References Cited

U.S. PATENT DOCUMENTS

| | | |
|---|---|---|
| 5,401,175 A | 3/1995 | Guimond et al. |
| 6,267,602 B1 | 7/2001 | Mendelson et al. |

(Continued)

FOREIGN PATENT DOCUMENTS

| | | |
|---|---|---|
| CN | 207853072 U | 9/2018 |
| CN | 111293474 A | 6/2020 |

OTHER PUBLICATIONS

Machine language translation of CN 207853072 (Year: 2018).*
CN 207853072 (Year: 2018).*

*Primary Examiner* — Ross N Gushi
(74) *Attorney, Agent, or Firm* — Norton Rose Fulbright Canada LLP

(57) ABSTRACT

A connector assembly for electrically connecting a first component to a second component, the connector assembly has a first connector having first contacts electrically connectable to the first component, and a first magnet secured to the first connector; and a second connector having second contacts electrically connectable to the second component, and a second magnet secured to the second connector, the first connector orientable relative to the second connector in a connecting orientation in which the first and second connectors are magnetically attracted to one another via one or both of the first and second magnets and in which the first contacts are electrically connected to the second contacts, and in a repelling orientation in which the first magnet is at least partially aligned with and repelling the second magnet for impeding connection between the first contacts and the second contacts.

17 Claims, 9 Drawing Sheets

(56) References Cited

U.S. PATENT DOCUMENTS

| | | | |
|---|---|---|---|
| 6,740,852 | B1 | 5/2004 | Wu et al. |
| 7,311,526 | B2 | 12/2007 | Rohrbach et al. |
| 7,351,066 | B2 | 4/2008 | DiFonzo et al. |
| 8,920,025 | B2 | 12/2014 | Andreatti |
| 2003/0045134 | A1 | 3/2003 | Downing |
| 2005/0082915 | A1 | 4/2005 | Steinberg |
| 2016/0141809 | A1 | 5/2016 | Choi |
| 2017/0138798 | A1 | 5/2017 | Brown et al. |

* cited by examiner

MAGNETIC CONNECTOR

CROSS-REFERENCE TO RELATED APPLICATIONS

This application claims benefit to U.S. Provisional patent application No. 62/896,098, filed on Sep. 5, 2019, the contents of which are hereby incorporated in their entirety.

TECHNICAL FIELD

The present disclosure relates generally to connectors and, more particularly, to connectors used to electrically connect two components together.

BACKGROUND OF THE ART

In the food industry, pieces of meat are cooked in industrial ovens and temperature probes are inserted therein for monitoring their temperature during cooking. These probes are connected via wires to a controller.

When taking the pieces of meat out of the oven after cooking, employees often forget to remove the probes, which can result in damages to the temperature probe as the probe wire gets ripped off from its connection to the temperature controller. This can cause serious production down time as an electrician has to wait for the oven to cool down to rewire a new temperature probe. This may also result in some of the pieces of meat falling on the ground and being wasted.

Therefore, improvements are needed.

SUMMARY

In a first aspect, there is provided a connector assembly for electrically connecting a first component to a second component, comprising: a first connector having first contacts electrically connectable to the first component, and a first magnet secured to the first connector; and a second connector having second contacts electrically connectable to the second component, and a second magnet secured to the second connector, the first connector orientable relative to the second connector in a connecting orientation in which the first and second connectors are magnetically attracted to one another via one or both of the first and second magnets and in which the first contacts are electrically connected to the second contacts, and in a repelling orientation in which the first magnet is at least partially aligned with and repelling the second magnet for impeding connection between the first contacts and the second contacts.

In accordance with the first aspect, the first connector comprises a third magnet adjacent to the first magnet, the second connector comprising a fourth magnet adjacent to the second magnet, each of the first, second, third, and fourth magnets having a first end having a first polarity and a second end opposite the first end, the second end having a second polarity opposite the first polarity, the first polarity of the first magnet adjacent to the second polarity of the third magnet, the first polarity of the second magnet adjacent to the second polarity of the fourth magnet, the first and third magnets respectively aligned with the second and fourth magnets in the repelling orientation, the first and third magnets respectively aligned with the fourth and second magnets in the connecting orientation.

In accordance with the first aspect, the first contacts are disposed between the first and third magnets and wherein the second contacts are disposed between the second and fourth magnets.

In accordance with the first aspect, each of the first and second connectors has a respective one of a first connector portion and a second connector portion engageable together in a waterproof connection.

In accordance with the first aspect, the waterproof connection is defined by an engagement of an annular tab of the first connector portion within an annular groove of the second connector portion, the annular tab and the annular groove extending annularly around a longitudinal axis of the connector assembly, the annular tab and the annular groove extending around the first and second contacts.

In accordance with the first aspect, each of the first connector portion and the second connector portion has a central portion surrounded by a respective one of the annular tab and the annular groove, the central portion of the first connector portion in abutment against the central portion of the second connector portion when the first connector and the second connector are in the connecting orientation and when the annular tab is received within the annular groove.

In accordance with the first aspect, the first and second contacts are sealingly engaged to the first and second connector portions.

In accordance with the first aspect, the annular tab defines at least one protrusion, the annular groove defined between the central portion of the second connector portion and a peripheral wall extending around the central portion, the peripheral wall defining at least one slot, the at least one protrusion engaging the at least one slot solely in the connecting orientation.

In accordance with the first aspect, each of the first and second connectors has a housing secured to a respective one of the first and second connector portions, and a magnet holder located within the housing, the magnet holder defining magnet-receiving apertures, the first magnet received with one of the magnet-receiving apertures of the first connector, the second magnet received within one of the magnet-receiving apertures of the second connector.

In accordance with the first aspect, the magnet holder has a rib separating the magnet-receiving apertures, the first contacts received within contact-receiving apertures defined by the rib of the magnet holder of the first connector, the second contacts received within contact-receiving apertures defined by the rib of the magnet holder of the second connector.

In accordance with the first aspect, each of the first and second connector portions defines second magnet-receiving apertures separated by a second rib, the first magnet received with one of the second magnet-receiving apertures of the first connector portion, the second magnet received within one of the second magnet-receiving apertures of the second connector portion, the first contacts received within second contact-receiving apertures of the second rib of the first connector portion, the second contacts received within second contact-receiving apertures of the second rib of the second connector portion.

In accordance with the first aspect, a retention force between the first and second connectors in the connecting orientation is about 10 pounds.

In accordance with the first aspect, the first contacts are aligned with the second contacts in both of the connecting orientation and the repelling orientation.

In accordance with the first aspect, the first connector has a first housing, a first magnet holder received within the first housing, and a first connector portion securable to the first housing, the second connector including a second housing, a second magnet holder received within the second housing, and a second connector portion securable to the second housing, the first housing having a shape identical to that of the second housing, the first magnet holder having a shape identical to that of the second magnet holder, the first connector portion different than the second connector portion.

In accordance with a second aspect, there is provided a connector forming part of a connector assembly for electrically connecting a first component to a second component, comprising: a housing; a connector portion secured to the housing and configured for engagement with another connector from the connector assembly; contacts electrically connectable to the first component and secured to the connector portion; a first magnet received within the housing; and a second magnet received within the housing adjacent to the first magnet, each of the first and second magnets having a first end having a first polarity and a second end opposite the first end, the second end having a second polarity opposite the first polarity, the first polarity of the first magnet adjacent to the second polarity of the second magnet, the first and second magnets configured to attract the other connector in a first orientation and to repel the other connector in a second orientation.

In accordance with the second aspect, the contacts are disposed between the first and second magnets.

In accordance with the second aspect, the connector portion is engageable to the other connector in a waterproof connection.

In accordance with the second aspect, the waterproof connection is defined by an engagement of an annular tab of one of the connector and the other connector and an annular groove of the other of the connector and the other connector.

In accordance with the second aspect, the connector portion has a central portion surrounded by the annular tab or the annular groove, the central portion configured to abut against a central portion of the other connector when the annular tab is received within the annular groove.

In accordance with the second aspect, the connector has a magnet holder secured within the housing, each of the first and second magnets received within a respective one of magnet-receiving apertures defined by the magnet holder, the contacts received within contact-receiving apertures defined through a rib of the magnet holder, the rib separating the magnet-receiving apertures.

DESCRIPTION OF THE DRAWINGS

Reference is now made to the accompanying figures in which.

DETAILED DESCRIPTION

Figure 1:
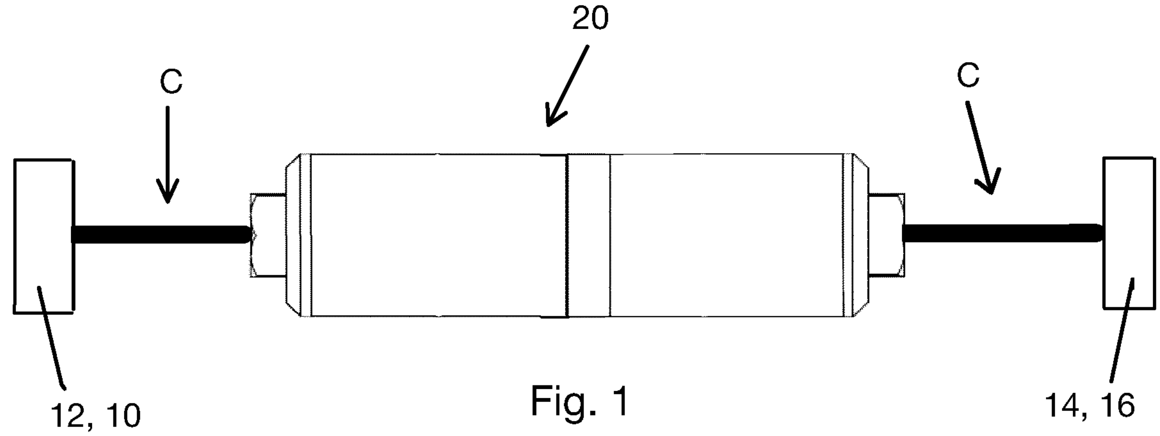
FIG. 1 is a schematic three dimensional view of an example magnetic connector assembly connecting a first component to a second component.

Referring to FIG. 1, a connector assembly is shown at 20 and is used to connect a first component 12 to a second component 14. Cables C are used to connect the first and second components 12, 14 to the connector assembly 20. In the embodiment shown, the connector assembly 20 is used to allow disconnection of the first component 12 from the second component 14 without having to disconnect the cables C from either one of the first and second components 12, 14. The cables C may be any suitable cables such as, for instance, power cables, Ethernet cables, coaxial cable, and so on. The first component 12 may be, for instance, a level transmitter, a proximity sensor, a safety equipment, a flow transmitter, a thermocouple, a pressure transmitter, an M12 connector, or any electric appliance (e.g., oven, deep fryer, computer, etc). The second component may be, for instance, a power outlet, a controller, an M12 connector, and so on.

In some cases, the connector assembly 20 is used to connect a temperature probe 10 to a controller 16 of an oven. The probe 10 is configured to be inserted into a piece of food, such as a piece of meat, for monitoring a cooking process of said piece of meat. As illustrated, the connector assembly 20 is configured for connecting two sections of the cable C together; each of the controller 16 and the probe 10 being connected to a respective one of the two sections of the cable C. The controller 16 is configured to receive signal(s) from the probe 10 regarding a temperature of the piece of meat, to notify a user when the piece of meat is cooked and/or for controlling a temperature of the oven used for cooking the piece of meat.

Once the piece of meat is cooked, an employee typically takes the piece of meat out of the oven. However, as the controller 16 may be secured to the oven, forgetting to withdraw the probe 10 from the piece of meat may result in a force that could damage the oven, the probe 10, and/or the piece of meat that may fall on the ground and be wasted.

Still referring to FIG. 1, the connector assembly 20 may be used to allow the probe 10 to be disconnected from the controller 16 upon exerting a pulling force on the connector assembly 20 such that forgetting to withdraw the probe 10 from the piece of meat prior to pulling the piece of meat out of the oven may not have the aforementioned consequences. It will be appreciated that the connector assembly 20 may be used to ease disconnecting of the two components 12, 14 without pulling on the cables sections C and/or on the components 12, 14.

Referring now to FIGS. 2-7, the connector assembly 20 is described in more detail. The connector assembly 20 includes two mating connectors, namely a first connector 22, also referred to as a male connector, and a second connector 24, also referred to as a female connector. The male and female connectors 22, 24, once in engagement with one another, allow the first and second components 12, 14 to be electrically connected to one another.

In the embodiment shown, the male and female connectors 22, 24 share parts that are similar. Consequently, the male connector 22 is described first and parts of the female connector 24 that differ from those of the male connector 22 are then described. Having the male and female connectors 22, 24 sharing similar parts can offer cost savings when manufacturing the connector 20.

Figure 2:
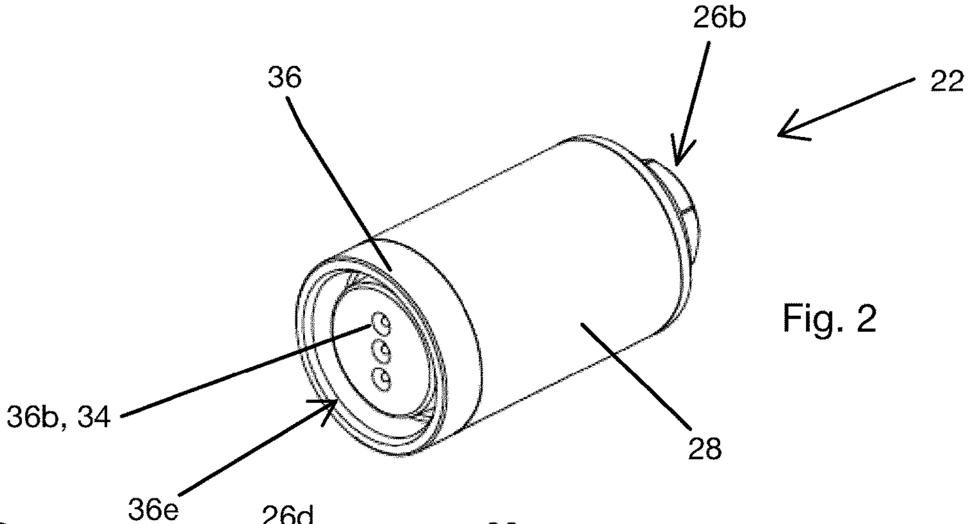
FIG. 2 is a three dimensional view of a male connector in accordance with one embodiment.
Figure 3:
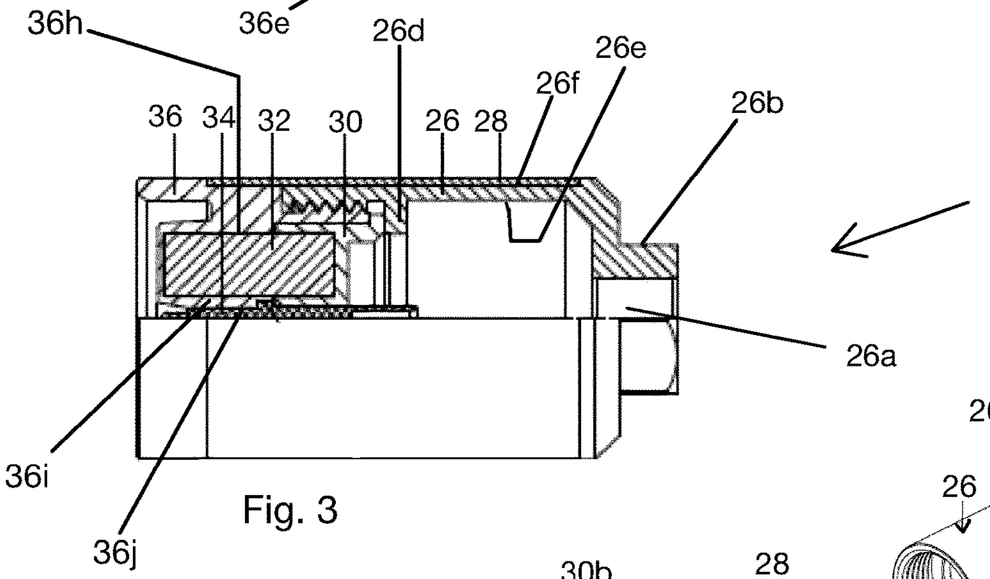
FIG. 3 is a side partial cut-away view of the male connector of FIG. 2.
Figure 4:
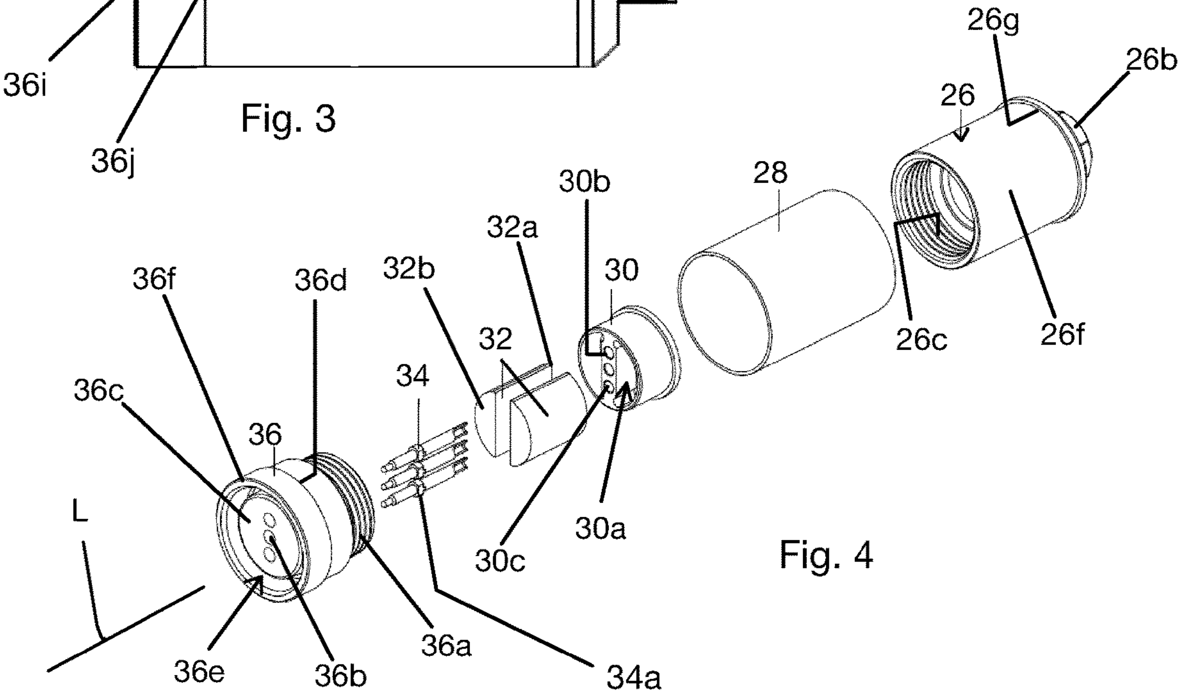
FIG. 4 is a three dimensional exploded view of the male connector of FIG. 2.

Referring to FIGS. 2-4, the male connector 22 includes a housing 26 that may have a substantially cylindrical shape. It is understood that any other suitable shapes are considered. The housing 26 is hollow and sized to contain other components of the male connector 22. The housing 26 defines an aperture 26*a* sized to receive the cable C (FIG. 1). In the embodiment shown, the housing 26 is made of food grade Teflon™, but any other suitable material able to withstand operating conditions of an environment in which the connector 20 will be used are contemplated. As illustrated, the housing 26 defines an hexagonal head 26*b* surrounding the aperture 26*a*. An inner surface 26*e* of the housing 26 defines inner threads 26*c* proximate an end opposed to the hexagonal head 26*b*. The inner surface 26*e* of the housing 26 further defines an annular shoulder 26*d* located between the inner threads 26*c* and the hexagonal head 26*b*. The annular shoulder is defined herein by a radial protrusion annularly extending around a longitudinal axis L of the male connector 22. The annular shoulder 26*d* may be defined by a change in diameter of the housing 26 at its inner surface 26*e*.

In the embodiment shown, a shell 28 is disposed around the housing 26 and is sized to abut a shoulder 26*g* defined by an outer surface 26*f* of the housing 26 proximate the hexagonal head 26*b*. The shoulder 26*g* is created by an increase in an outer diameter of the housing 26 at its outer surface 26*f*. The shell 28 may be used to increase a mechanical strength (e.g., stiffness) of the male connector 22. A part number, company name, and other information may be engraved on the shell 28. In the depicted embodiment, the shell 28 is made of stainless steel, but any other suitable material is contemplated.

The male connector 22 further includes a magnet holder 30 defining two apertures 30*a* each sized to receive a respective one of two magnets 32 and spaced apart via a rib 30*b* so that the two magnets 32 are not in contact with each other. The rib 30*b* defines apertures 30*c*, of which there are three in the embodiment shown, that extend about a longitudinal axis L of the male connector 22. The magnet holder 30 is sized to be received within the housing 26 and abuts against the annular shoulder 26*d* of the inner surface 26*e* of the housing 26. In the embodiment shown, the apertures 30*a* have a semi-cylindrical shape, but other suitable shapes may be used, such as square, cylindrical, triangular, and so on. In the present embodiment, the shape of the apertures 30*a* correspond to that of the magnets 32. The magnet holder 30 is made of Teflon™, but other materials are contemplated.

It is understood that the magnets 32 may be electro magnets. In the embodiment shown, the magnets are made of steel, but any other suitable material may be used.

The two magnets 32 are inserted in the apertures 30*a* of the magnet holder 30 in such a way that similar polarities are not adjacent one another. In other words, each of the magnets 32 has opposed ends 32*a*, 32*b* each having a respective one of a first polarity and a second polarity opposite the first polarity. The first polarity may be a positive polarity whereas the second polarity may be a negative polarity. The two ends 32*a*, 32*b*, and hence the opposed polarities, are offset longitudinally from one another relative to the longitudinal axis L of the connector 20. In the embodiment shown, one of the magnets 32 has its end 32*b* having a positive polarity located adjacent the end 32*b* of the other of the magnets 32 having a negative polarity. Having the magnets 32 disposed this way is such that the magnets 32 attract one another when received within the magnet holder 30.

The male connector 22 further includes first contacts 34, also referred to as contact pins, or pins, which are made of a copper alloy or any other suitable material. In the embodiment shown, three first contacts 34 are used; each of the three first contacts 34 being received within a respective one of the apertures 30*c* defined through the rib 30*b* of the magnet holder 30. The first contacts 34 are press-fitted within the apertures 30*c*. Any suitable means for securing the first contacts 34 to the magnet holder 30 are contemplated. Each of the first contacts 34 is electrically connected to a respective one of wires of the cable C. The wires may be clamped within the first contacts 34, welded, brazed, or secured in any suitable manner. The first contacts 34 may have a gold plating of a minimum thickness of 10 microns over a nickel underplating of a minimum thickness of 40 microns. These platings may limit corrosion of the contacts. Any suitable plating may be used. In some cases, the plating may be omitted.

The male connector 22 includes a first, or male, connector portion 36 that is matingly engageable by a female connector portion 40 (FIG. 7) of the female connector 24.

The male connector portion 36 defines outer threads 36*a* threadingly engageable to the inner threads 26*c* of the housing 26 when the male connector portion 36 is secured to the housing 26. The hexagonal head 26*b* may be used to fasten the male connector portion 36 to the housing 26 via their respective threads 36*a*, 26*c*. The male connector portion 36 defines apertures 36*b*, of which there are three in the embodiment shown, each sized to receive a respective one of the first contacts 34. The male connector portion 36 has a central portion 36*c* and a peripheral portion 36*f* circumferentially extending around the central portion 36*c* and around the longitudinal axis L. An annular groove 36*e* is defined radially between the central and peripheral portions 36*c*, 36*f* and circumferentially extends all around the connector portion 36 and surrounding the apertures 36*b*. The annular groove 36*e* extends all around the longitudinal axis L of the male connector 22. The male connector portion 36 is made of Teflon™, but other materials are contemplated. In the embodiment shown, the first contacts 34 are recessed within the male connector portion 36.

In the embodiment shown, an outer diameter of the male connector portion 36 is greater than that of the housing 26 such that the shell 28 is sandwiched between the male connector portion 36 and the annular shoulder 26*g* defined at the outer surface 26*f* of the housing 26. In other words, the male connector portion 36 defines a shoulder 36*d* annularly extending around the longitudinal axis L. The shell 28 is in abutment against the two shoulders 36*d*, 26*g* of the male connector portion 36 and of the housing 26.

The male connector portion 36 further defines two magnet-receiving apertures 36*h* that are sized and shaped to receive a portion of the magnets 32 that is not contained within the apertures 30*a* of the magnet holder 30. The two magnet-receiving apertures 36*h* of the male connector portion 36 are separated by a rib 36*i* that defines apertures 36*j* for receiving the first contacts 34. The magnets 32 are therefore received in both of the apertures 36*h* of the male connector portion 36 and in the apertures 30*a* of the magnet holder 30. As shown in FIG. 4, each of the first contacts 34 defines a central portion 34*a* that has a greater diameter than a remainder of the contacts 34. The central portions 34*a* of the first contacts 34 are sandwiched between the ribs 36*i*, 30*b* of the male connector portion 36 and the magnet holder 30 for holding the contacts 34 relative to the male connector 22. In other words, having the central portions 34*a* in abutment against the two ribs 36*i*, 30*b* allows to substantially lock the first contacts 34 inside the housing 26. The two ribs 36*i*, 30*b* are aligned with one another such that each aperture 36*j* defined through the rib 36*i* of the male connector portion 36 is aligned with a respective one of the apertures 30*c* defined though the rib 30*b* of the magnet holder 30.

Figure 5:
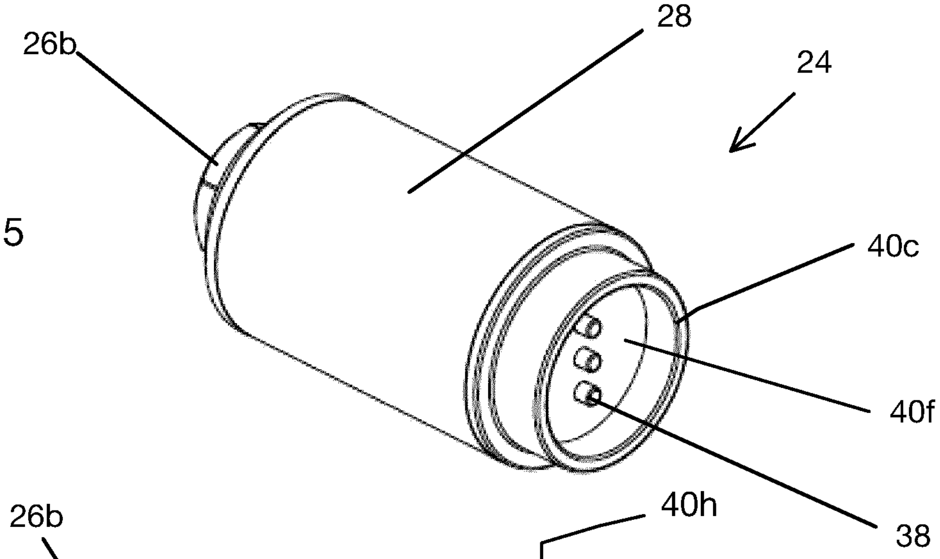
FIG. 5 is a three dimensional view of a female connector engageable to the male connector of FIG. 2, in accordance with one embodiment.
Figure 6:
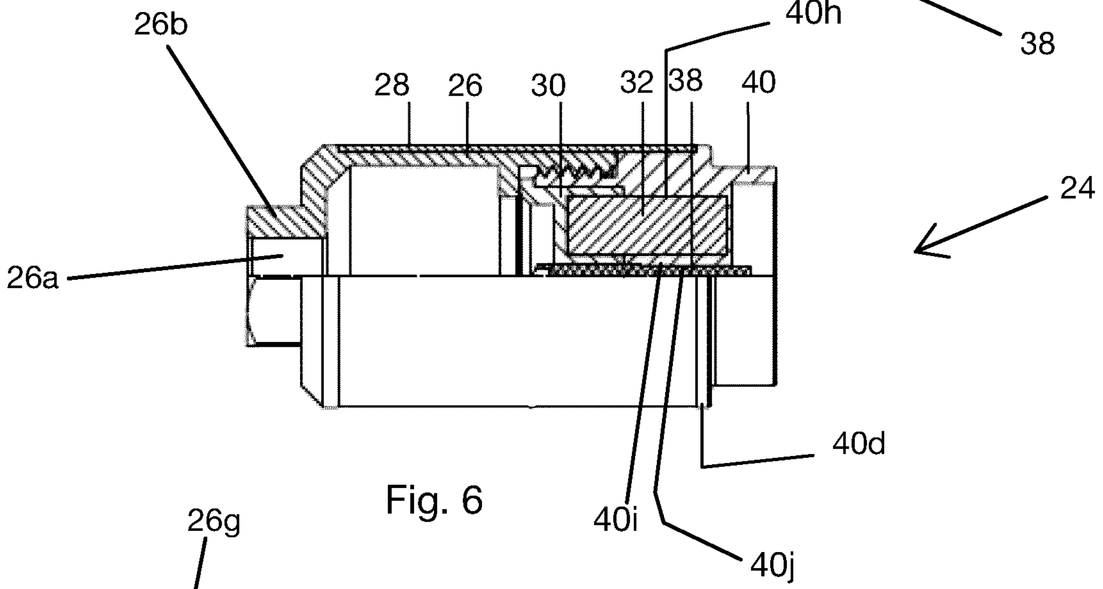
FIG. 6 is a side partial cut-away view of the female connector of FIG. 5.
Figure 7:
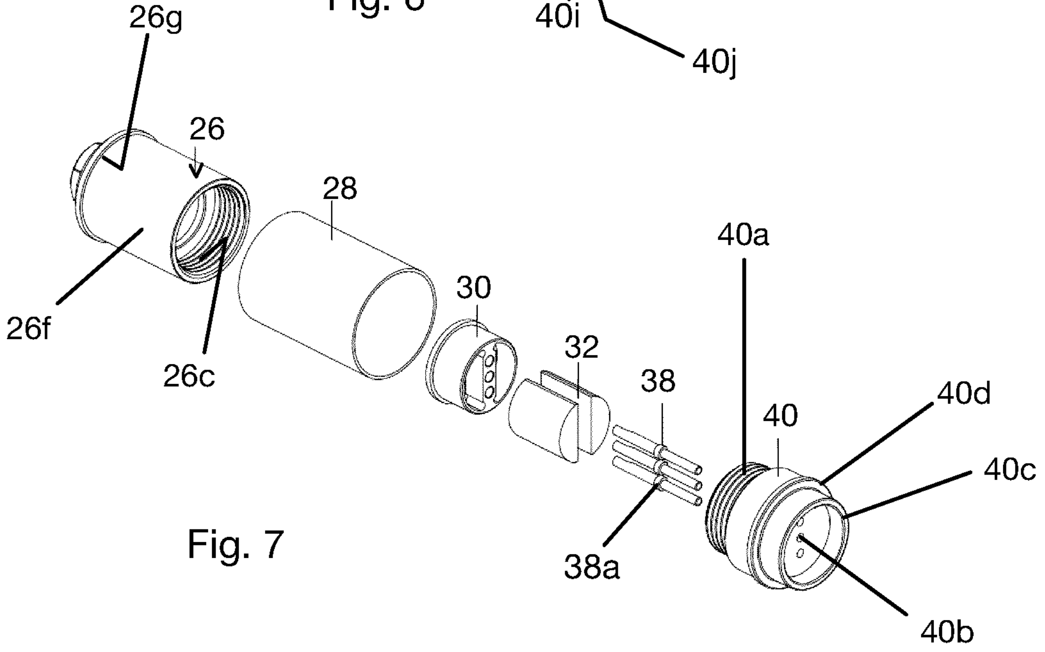
FIG. 7 is a three dimensional exploded view of the female connector of FIG. 5.

Referring now to FIGS. 5-7, the female connector 24 of the connector 20 is described in more detail. For the sake of conciseness, only elements that differ from the male connector 22 are described herein below.

The female connector 24 includes second contacts 38, of which there are three in the embodiment shown, sized to be matingly engaged with the first contacts 34 (FIG. 4) of the male connector 22. The second contacts 38 are made of a copper alloy, but other materials are contemplated. The second contacts 38 have a gold plating of a minimum thickness of 10 microns over a nickel underplating of a minimum thickness of 40 microns. Any suitable plating may be used. In some case, the plating may be omitted.

It is understood that the first and second contacts 34, 38 may be replaced by any other types of contacts. For instance, the first and second contacts 34, 38 may be pins configured to contact one another at their tips when the male connector 22 is engaged with the female connector 24.

The female connector 24 includes a female connector portion 40 sized to matingly engage the male connector portion 36 (FIG. 4) of the male connector 22. The female connector portion 40 defines outer threads 40*a* threadingly engageable to the threads 26*c* of the housing 26 when the female connector portion 40 is secured to the housing 26. The female connector portion 40 has a central portion 40*f* defining apertures 40*b*, of which there are three in the embodiment shown, each sized to receive a respective one of the second contacts 38. The female connector portion 40 defines an annular tab 40*c* circumferentially extending all around the central portion 40*f* and surrounding the apertures 40*b*. The female connector portion 40 may be made of Teflon™ or any other suitable material. In the embodiment shown, the annular tab 40*c* is received within the annular groove 36*e* when the male and female connectors 22, 24 are engaged with each other. In the embodiment shown, the second contacts 38 protrude beyond the central portion 40*f* of the female connector portion 40 toward the male connector portion 36. When the male and female connectors 22, 24 are engaged with one another, and when the annular tab 40*c* is received within the annular groove 36*e*, the second contacts 38 are partially received within the apertures 36*b* of the male connector portion 36 to electrically connect the first and second contacts 34, 38 together.

In the embodiment shown, the female connector portion 40 defines an annular protrusion 40*d* protruding radially beyond a remainder of the female connector portion 40. The shell 28 is sandwiched between the annular protrusion 40*d* of the female connector portion 40 and the annular shoulder 26*g* defined at the outer surface 26*f* of the housing 26.

The female connector portion 40 further defines two magnet-receiving apertures 40*h* that are sized and shaped to receive a portion of the magnets 32 that is not contained within the apertures 30*a* of the magnet holder 30. The two magnet-receiving apertures 40*h* of the female connector portion 40 are separated by a rib 40*i* that defines apertures 40*j* for receiving the second contacts 38. The magnets 32 are therefore received in both of the apertures 40*h* of the female connector portion 40 and in the apertures 30*a* of the magnet holder 30. The second contacts 38 have central portions 38*a* of greater diameter than a remainder of the second contacts 38 and sized to be sandwiched and in abutment between the ribs 40*i*, 30*b* of the female connector portion 40 and of the magnet holder 30. The two ribs 40*i*, 30*b* are aligned with one another such that each aperture 40*j* defined through the rib 40*i* of the male connector portion 40 is aligned with a respective one of the apertures 30*c* defined though the rib 30*b* of the magnet holder 30.

In the embodiment shown, the first and second contacts 34 and 38 are engageable with one another in two orientations of the male connector 22 relative to the female connector 24. Herein, the two orientations are offset from 180 degrees from one another.

In some applications, the two connectors 22, 24 must be connected with each other in a unique way for the two components 12, 14 (FIG. 1) to operate properly. In other words, each of the second contacts 38 must be connected with a designated one of the first contacts 34 for proper operation of the components 12, 14. Consequently, a deterrent may be used to prevent a user from connecting the two connectors 22, 24 in a wrong orientation resulting in a faulty connection between the contacts 34, 38.

In the present case, the magnets 32 of both of the male and female connectors 22, 24 are disposed such that similar polarities are aligned with each other, and hence repel each other, when a user is trying to connect the male connector 22 to the female connector 24 in the wrong orientation. Opposed polarities of the magnets 32 of the male and female connectors 22, 24 are aligned when the correct orientation is achieved. Therefore, when the correct orientation is achieved, the male connector 22 is attracted to the female connector 24, and the male and female connectors 22, 24 are magnetically connected to one another. The magnets 32 may provide a retention force to the male and female connectors 22, 24 of about 10 pounds. Alternatively, each of the magnets 32 may have a retention force of about 10 pounds. The magnets 32 may have a retention force greater than 10 pounds. It will be appreciated that the retention force of the magnets 32 may be selected depending on the intended use of the connector assembly 20. Stronger magnets may be required for higher caliber cables C. In some cases, thin sheets of a magnetically attractable material may be disposed between the ribs of the magnet holder and the magnets 32 to increase a force of the magnets 32. The thin sheets may be made, for instance, of steel or any other suitable material.

Moreover, the magnets 32, may guide the male and female connectors 22, 24 in the correct orientation when the male and female connectors 22, 24 become sufficiently close to each other. In other words, in a given range of orientations of the male connector 22 relative to the female connector 24, the magnets 32 of the male and female connectors 22, 24 may induce a rotational force on the connectors 22, 24 about the longitudinal axis L that provides a feedback to a user holding the two connector 22, 24. The feedback may then guide the user in correctly aligning the two connectors 22, 24 in the correct orientation without requiring the user to look at the connectors 22, 24 before trying to mate them. Even if the two connectors 22, 24 were connectable to one another at two different relative positions, which may be offset from one another by 180 degrees, the magnets 32 may help in guiding the two connectors 22, 24 in a closest one of the two different relative positions, thereby facilitating the mating of the connectors 22, 24.

In a particular embodiment, a repelling force of the magnets 32 is sufficient to separate the male and female connectors 22, 24 apart after the male and female connectors 22, 24 have been forcefully engaged in the wrong orientation. In the present case, the repelling force of the magnets 32 is able to overcome a force generated by a frictional engagement of the annular groove 36*e* and annular tab 40*c* of the male and female connector portions 36, 40 to disengage the connectors 22, 24 after they have been forcefully engaged to one another in the wrong orientation. In the embodiment shown, the magnetic force generated by the magnets 32 is sufficient to engage the annular tab 40*c* within the annular groove 36*e*. In other words, the user may not have to push the female and male connectors 24, 22 toward one another along the longitudinal axis L to insert the annular tab 40*c* into the annular groove 36*e* and to connect the first and second contacts 34, 38 to one another.

In the embodiment shown, the male connector 22 is orientable relative to the female connector 24 in a connecting orientation in which the connectors 22, 24 are magnetically attracted to one another via at least two of the magnets 32 of the connectors 22, 24 and in which the first contacts 34 are electrically connected to the second contacts 38, and in a repelling orientation in which at least one magnet 32 of the male connector 22 is at least partially aligned with and repels at least one magnet 32 of the female connector 24 for impeding connection between the first contacts 34 and the second contacts 38.

In the embodiment shown, when the male and female connectors 22, 24 are properly oriented relative to each other, one of the magnets 32 of the male connector 22 is magnetically coupled to one of the magnets 32 of the female connector 24, and the other of the magnets 32 of the male connector 22 is magnetically coupled to the other of the magnets 32 of the female connector 24.

Herein, "magnetically coupled" means that a magnetic attraction force is created between the magnets. The magnets 32 may not need to be in contact with each other for the connectors 22, 24 to be magnetically coupled to one another; they may be separated via a small gap and/or by a piece of magnetically conductive material. Herein, a material is said to be "magnetically conductive" if it does not prevent the magnetic field from passing therethrough. It is appreciated that a magnetically conductive material may decrease an amplitude of a magnetic force of a magnetic field as long as a sufficient magnetic force remains to attract the connectors toward one another.

As the connector 20 is used within the oven, or other environment susceptible of wetting the cable C, the connection between the male and female connectors 22, 24 may be waterproof. In the embodiment shown, a waterproof connection is provided by an engagement of the annular tab 40*c* of the female connector 24 with the annular groove 36*e* of the male connector 22. Such engagement may be a sealing engagement substantially limiting a fluid from flowing between the annular tab 40*c* and annular groove 36*e*. This may allow the connector 20 to withstand cleaning of the oven during wash-downs. In the embodiment shown, the annular groove 36*e* and the annular tab 40*c* have closely mating shapes that may define a sealing engagement therebetween to limit fluid penetration between the annular groove and the annular tab. Furthermore, fluid may be prevented from circulating between the male and female contacts 34, 38 and the apertures 30*c* of the magnet holders 30 as the male and female contacts 34, 38 may be press-fitted in the apertures. In other words, a sealing engagement may be defined between the contacts 34, 38 and the magnet holders 30.

In the embodiment shown, the central portions 36*c*, 40*f* of the male and female connector portions 36, 40 are in abutment against one another when the connectors 22, 24 are engaged. The contact between the central portions 36*c*, 40*f* may further help in providing a waterproof connection between the connectors 22, 24. Moreover, the first and second contacts 34, 38 are, in the present embodiment, tight fitted inside the apertures 36*b*, 40*b* of the male and female connector portions 36, 40. This tight fit engagement may further help in providing a waterproof connection between the connectors 22, 24. In other words, a sealing engagement is defined between the contacts 34, 38 and the male and female connector portions 36, 40. In a particular embodiment, a di-electric paste may be inserted within the housings 26. This paste may prevent a fluid from electrically bridging a gap between the contacts 34, 38. This may further assist in making the connector assembly 20 safe for use in a wetted environment.

In the present disclosure, "waterproof" means that the connection meets IP67 specifications, meaning that the connector 20 may be contained within a body of water up to a depth of one meter for 30 minutes while preventing water from penetrating.

Figure 8:
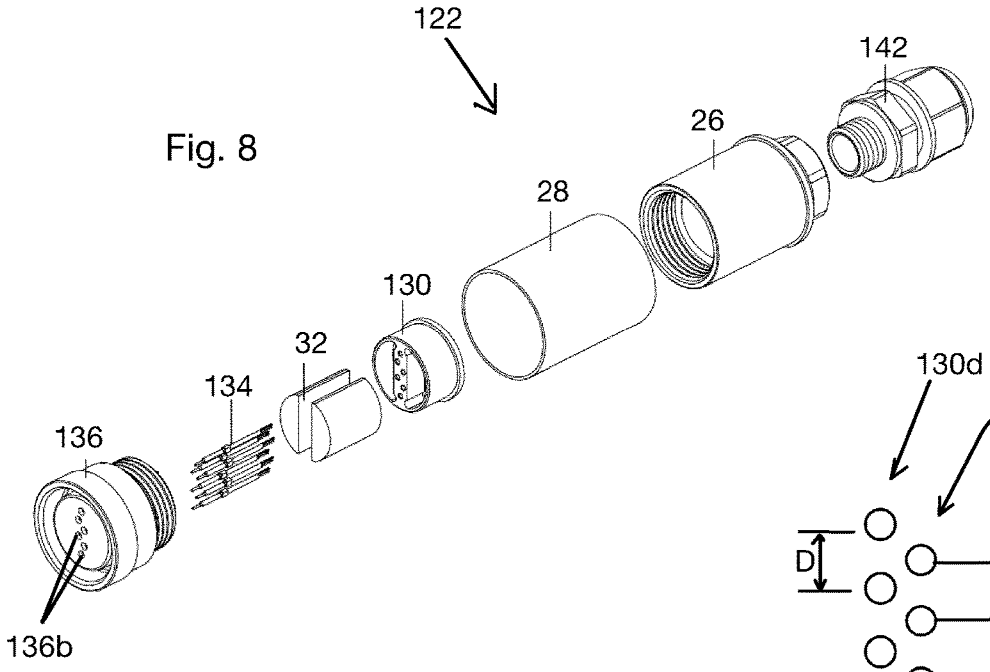
FIG. 8 is a three dimensional exploded view of a male connector in accordance with another embodiment.

Referring now to FIG. 8, another embodiment of the male connector is shown generally at 122. For the sake of conciseness, only elements that differ from the male connector 22 described herein above with reference to FIGS. 2-4 are described herein below.

The male connector 122 includes a magnet holder 130 in accordance with another embodiment. The magnet holder 130 defines six apertures 130*c* through the rib 130*b* separating the two apertures 130*a*, which receive the magnets 32. Each of the six apertures 130*c* receives a respective one of six first contacts 134. Each of the six first contacts 134 is received within a respective one of apertures 136*b* defined through the male connector portion 136.

Figure 9:
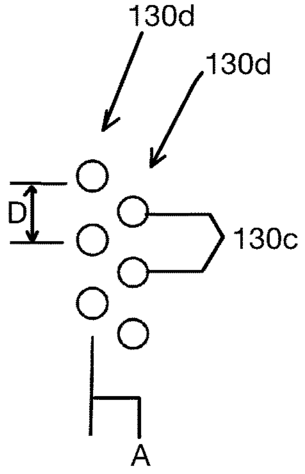
FIG. 9 is a schematic front view of a portion of the male connector of FIG. 8.

Referring to FIG. 9, in the embodiment shown, the six apertures 130*c* are separated in two rows 130*d* of three apertures 130*c* each. The apertures 130*c* within each of the two rows may be separated by a distance D from one another. The apertures 130*c* within each of the two rows may be equidistantly separated from one another. The distance D between two adjacent ones of the apertures 130*c* of one of the rows 130*d* may be equal to the distance between two adjacent ones of the apertures 130*c* of the other one of the two rows 130*d*. In the embodiment shown, the two rows

130*d* are offset from one another such that a given aperture 130*c* of one of the rows 130*d* is located axially between two apertures 130*c* of the other one of the two rows 130*d* relative to an axis A along which the apertures 130*c* within a row 130*d* are distributed. In other words, the apertures 130*c* of one of the rows 130*d* are staggered relative to those of the other of the two rows 130*d*. The apertures 130*c* of one of the two rows 130*d* may be centered between two of the apertures 130*c* of the other of the two rows 130*d*. Any other suitable disposition of the apertures 130*c* may alternatively be used.

Figure 10:
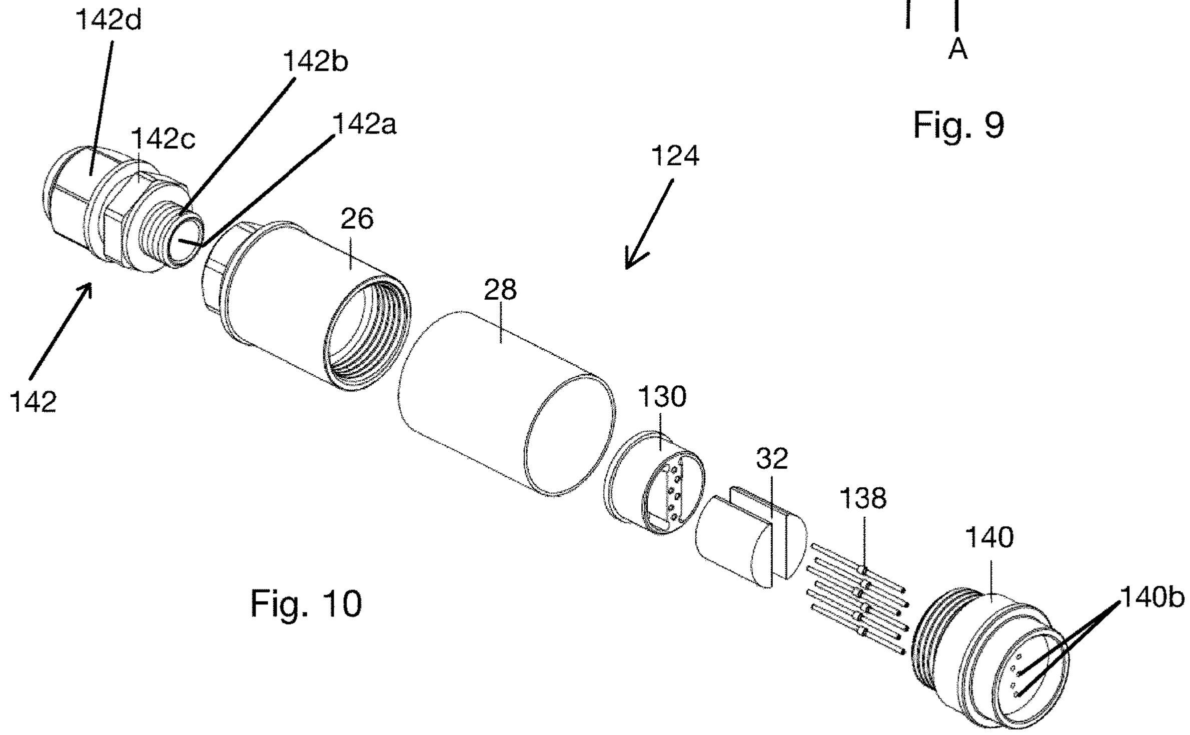
FIG. 10 is a three dimensional exploded view of a female connector engageable to the male connector of FIG. 8, in accordance with another embodiment.

Referring to FIG. 10, another embodiment of the female connector is shown generally at 124. For the sake of conciseness, only elements that differ from the female connector 24 described herein above with reference to FIGS. 5-7 and from the male connector 122 described above with reference to FIG. 8 are described herein below.

The female connector 124 includes six second contacts 138 each received within a respective one of the apertures 130*b* defined through the magnet holder 130 and received within a respective one of apertures 140*b* defined through the female connector portion 140. The distribution of the second contacts 138 corresponds to that of the first contacts 136 to allow their engagement upon the male connector engaging with the female connector.

Referring to FIGS. 8 and 10, the male and female connector 122, 124 each include a cable gland 142. The cable gland 142 defines an aperture 142*a* sized for receiving the cable C (FIG. 1) therethrough. The cable gland 142 in accordance with the embodiment shown includes a threaded portion 142*b* threadingly engaging corresponding threads of the aperture 26*a* (FIG. 3) of the housing 26. The cable gland 142 includes a first nut 142*c* secured to the threaded portion 142*b* and a second nut 142*d* threadingly engaged to the first nut 142*c*. The cable gland 142 is operable to tighten the cables C upon rotating the first and second nuts 142*c*, 142*d* relative to one another. Any suitable cable gland known in the art may be used without departing from the scope of the present disclosure.

The cable gland 142 may allow for a more secure connection of the cable C to the contacts 134, 136 compared to a configuration lacking such cable gland. A force required to pull the cable C out of the cable gland 142 is, in some embodiments, greater than a force required to separate the magnets 32 of the male and female connector 122, 124. The cable gland 142 is made of a material that is acid and alkali proof. However, any suitable material for the cable gland 142 is contemplated.

The cable gland 142 includes a gasket configured to squeeze circumferentially around the cable C as the nut 142*c* is tightened around the shank 142*d*. The gasket, when tightened around the cable C, may prevent fluid from penetrating between the cable C and the gasket.

In an alternate embodiment, each of the male and female connectors 22, 24, 122, 124 may have one of their magnets 32 replaced by a magnetically attractable material. The two remaining magnets 32 of the male and female connectors 22, 24 are aligned and repel each other when the male and female connectors 22, 24 are in the wrong orientation relative to one another.

In another alternate embodiment, one of the connectors may have one of its magnets 32 replaced by a magnetically attractable material whereas the other of the connectors may have one of its magnets 32 removed, leaving empty the aperture 30*a*. The two of the remaining magnets 32 of the male and female connectors 22, 24 are aligned and repel each other when the male and female connectors 22, 24 are in the wrong orientation relative to one another.

Herein, "magnetically attractable" represents a material having the property of being attracted by a magnet. Such materials may contain, for instance, ferrous particles. Such materials may be iron or an iron alloy. Any suitable materials that may be attracted by a magnet may be used.

Referring now to FIGS. 11 to 15, another embodiment of a first, or male, connector is shown generally at 222. For the sake of conciseness, only elements that differ from the male connector 122 of FIG. 8 are described herein below.

The male connector 222 has a housing 226 differing from the housing 26 described above with reference to FIG. 2, by having a longer hexagonal head 226*b* than the hexagonal head 26*b* of the connector 22 described above. The hexagonal head 226*b* of the housing 226 has an aperture 226*a* and inner threads 226*h* extending around the aperture 226*a* and engageable by a cable gland 242. The housing 226 further defines an inner shoulder 226*i* proximate the inner threads 226*h*.

Figure 12:
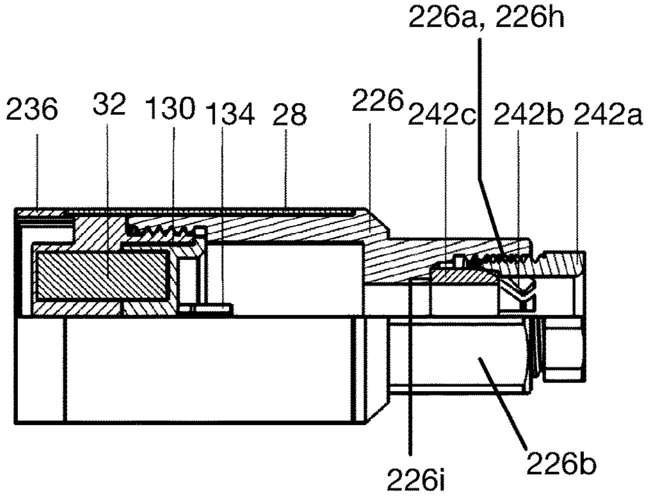
FIG. 12 is a side partial cut-away view of the male connector of FIG. 11.
Figure 13:
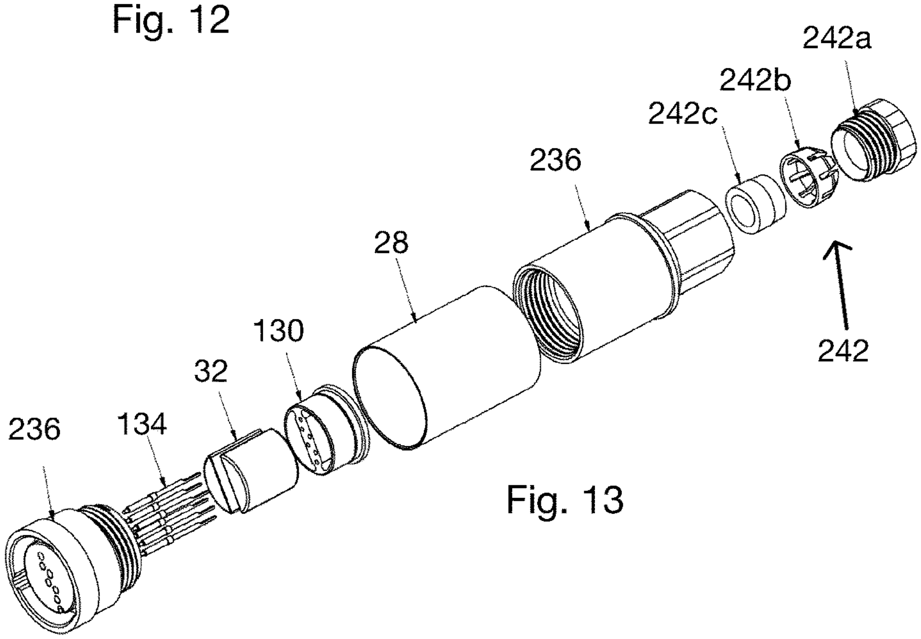
FIG. 13 is a three dimensional exploded view of the male connector of FIG. 11.
Figure 14:
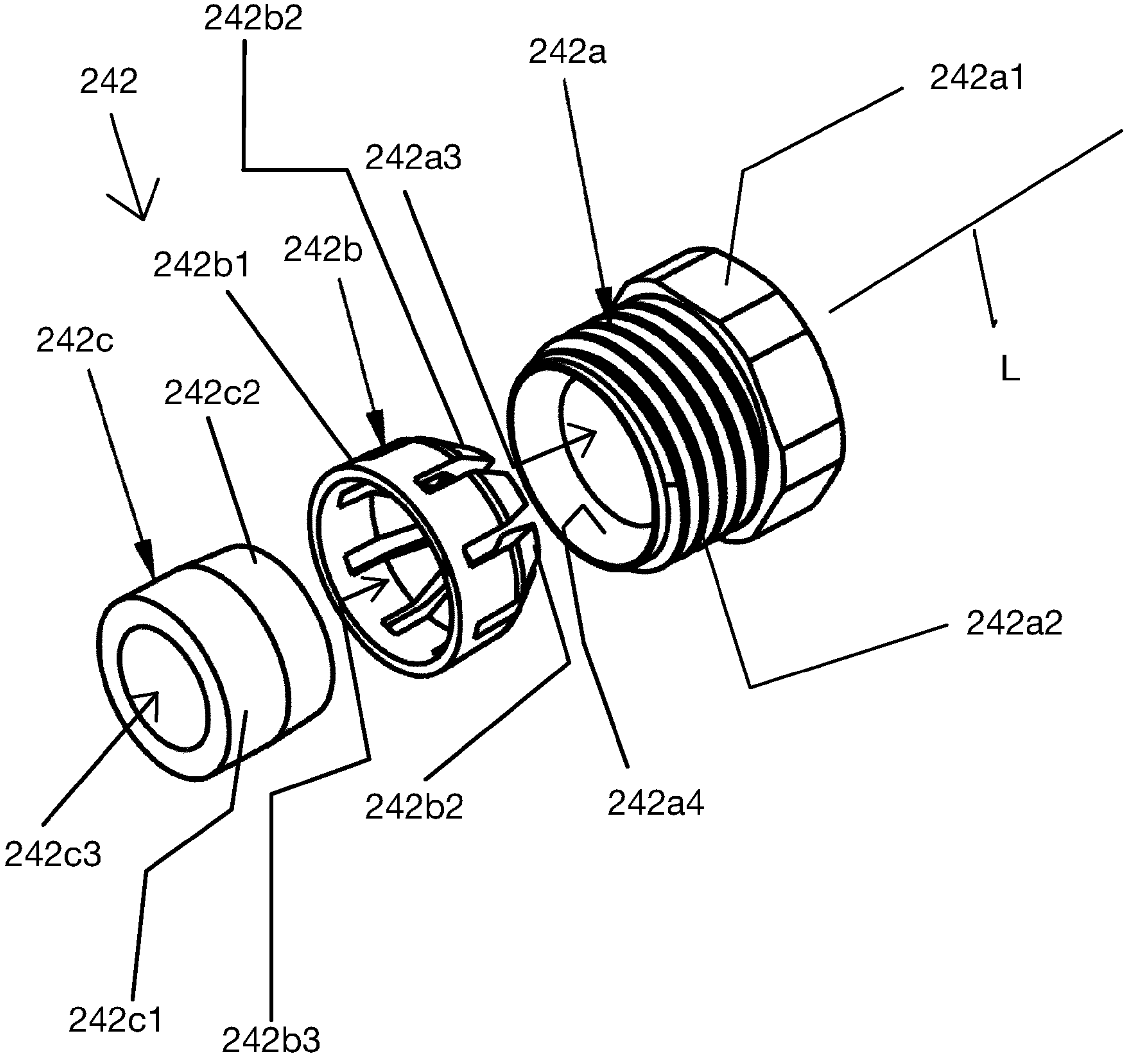
FIG. 14 is an enlarged view of a portion of FIG. 13 illustrating a cable gland in accordance with one embodiment.

Referring to FIGS. 12 and 14, the cable gland 242 includes a nut 242*a*, a claw 242*b* and a sealing ring 242*c*. The sealing ring 242*c* is received within the housing 226 and abuts against the inner shoulder 226*i* of the housing 226. The sealing ring 242*c* has a cylindrical portion 242*c*1 and a frustoconical portion 242*c*2 protruding from the cylindrical portion 242*c*1. The frustoconical portion 242*c*2 is at least partially received within the claw 242*b*. The claw 242*b* includes a base 242*b*1 and circumferentially distributed prongs 242*b*2 protruding from the base 242*b*1 along the longitudinal axis L. The prongs 242*b*2 converge radially inwardly from roots, which are secured to the base 242*b*1, to tips. The prongs 242*b*2 are flexible such that they can be elastically deformed relative to the base 242*b*1. The tips of the prongs 242*b* become closer to one another and may contact one another when the prongs 242*b*2 are deflected radially inwardly relative to the longitudinal axis L.

The nut 242*a* defines a hexagonal head 242*a*1 and a shank defining outer threads 242*a*2 threadingly engageable to the inner threads 226*h* of the housing 226. Each of the sealing ring 242*c*, the claw 242*b*, and the nut 242*a* defines an internal passage 242*c*3, 242*b*3, 242*a*3 for receiving the cable C. The internal passage 242*a*3 of the nut 242*a* has a frustoconical portion 242*a*4 and a cylindrical portion protruding from the frustoconical portion 242*a*4 toward the head 242*a*1.

To secure the cable gland 242 to the housing 226, and after the cable C has been inserted through the internal passages 242*c*3, 242*b*3, 242*a*3 of the sealing ring 242*c*, claw 242*b*, and head 242*a* of the gland 242, the sealing ring 242*c* is inserted into the aperture 226*a* of the hexagonal head 226*b* until it abuts the inner shoulder 226*i* of the housing 226. The claw 242*b* is inserted into the aperture 226*a* of the housing 226 until the prongs 242*b*2 are in abutment against the frustoconical portion 242*c*2 of the sealing ring 242. The head 242*a* is engaged with the housing 226 via the threading engagement between the outer threads 242*a*2 of the head 242*a* and the inner threads 226*h* of the housing 226. The head 242*a* is rotated relative to the housing 226 until the frustoconical portion 242*a*4 is in abutment against the prongs 242*b*2 of the claw 242. As the head 242*a* is tightened on the housing 226, the prongs 242*b*2 are pushed radially inwardly toward the cable C and bias the sealing ring 242*c* radially inwardly against the cable C until a sealing engagement between the cable C and the sealing ring 242*c* is achieved. In other words, the sealing ring 242*c* is biased against the cable C via the prongs 242*b*2 of the claw 242*b* to secure the cable C relative to the male connector 222 when the head 242*a* of the cable gland 242 is fastened into the housing 226. The sealing ring 242*c* may be made of an elastomeric material. Any suitable material may be used. An inner diameter of the sealing ring 242*c* is selected as a function of a diameter of the cable C. The inner diameter of the sealing ring 242*c* is sized to be able to provide the sealing engagement between the sealing ring 242*c* and the cable C.

Figure 11:
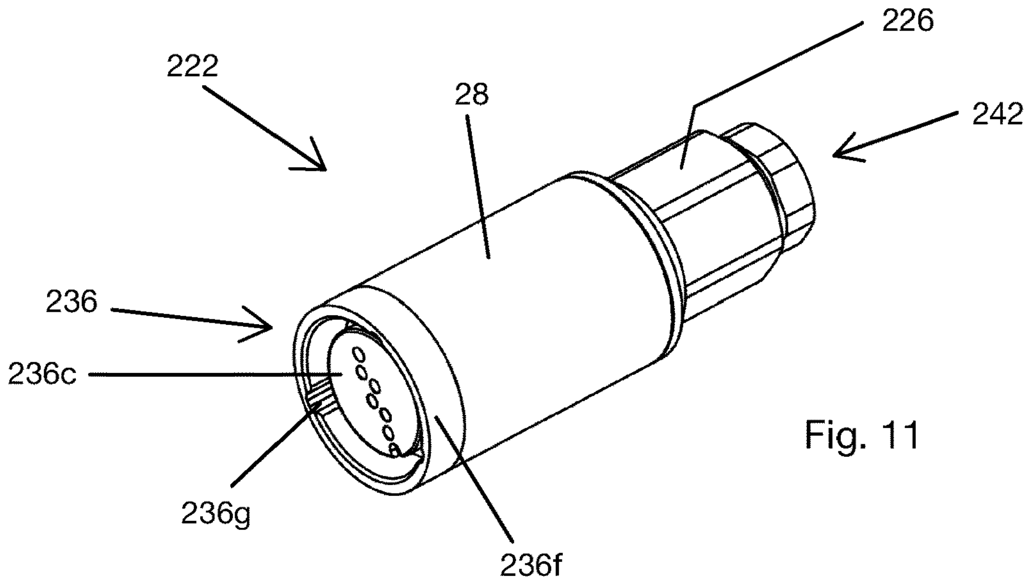
FIG. 11 is a three dimensional view of a male connector in accordance with another embodiment.
Figure 15:
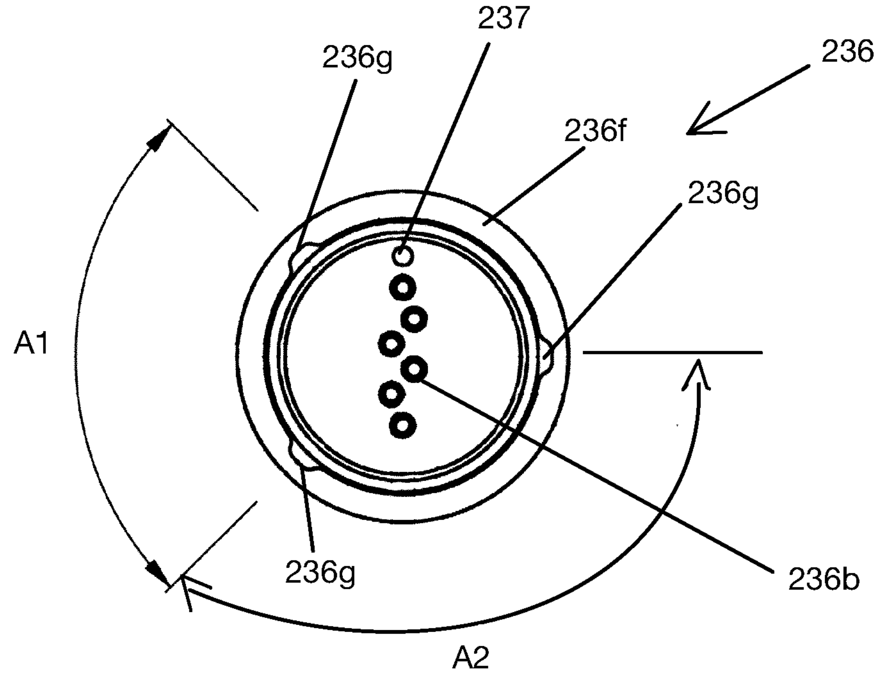
FIG. 15 is a front view of the male connector of FIG. 11.

Referring to FIGS. 11 and 15, the male connector 222 has a male connector portion 236 similar to the male connector portion 136 described above with reference with FIG. 8. However, the male connector portion 236 of the present embodiment defines circumferentially spaced-apart slots 236*g* on an inner side of the peripheral portion 236*f*. The slots 236*g* are oriented radially inward relative to the longitudinal axis L and toward the central portion 236*c*. In the embodiment shown, first and second slots 236*g* are spaced apart from one another by an angle A1 of 90 degrees; the first and second slots 236*g* being adjacent to each other. Both of the first and second slots 236*g* are spaced apart from a third slot by an angle A2 of 135 degrees. In other words, the slots are distributed non-uniformly around a circumference of the peripheral portion 236*f* of the male connector portion 236.

In the embodiment shown, a marker 237, which is herein a recess, may be defined by the male connector portion 236 to indicate which of the apertures 236*b* is to be associated with a given one of the wires of the cable C. In the present embodiment, a similar marker is present on the female connector portion 240.

Figure 16:
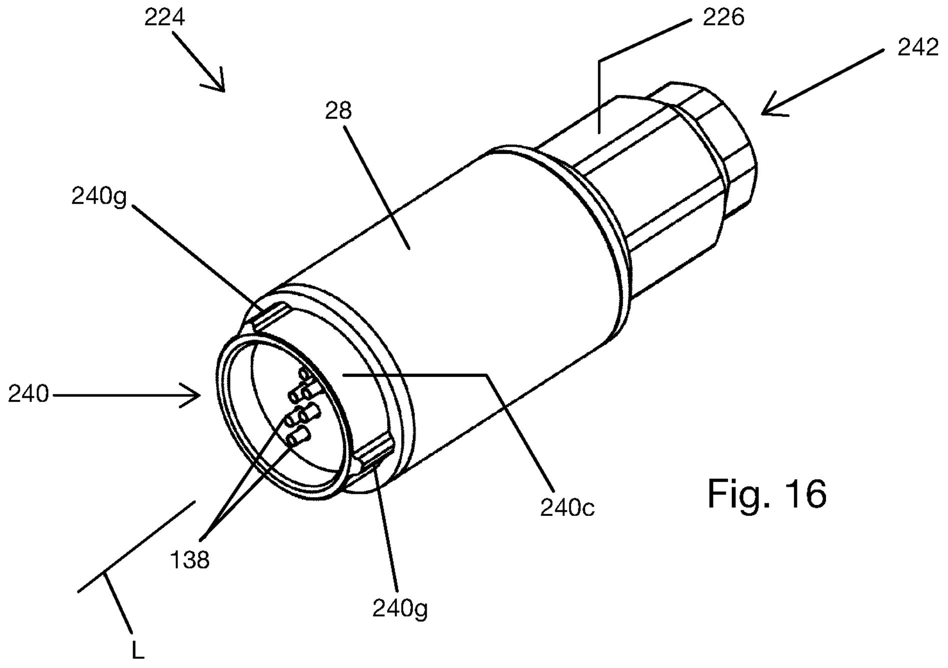
FIG. 16 is a three dimensional view of a female connector engageable to the male connector of FIG. 11, in accordance with another embodiment.

Referring to FIG. 16, another embodiment of the female connector is shown generally at 224. For the sake of conciseness, only elements that differ from the female connector 124 described herein above with reference to FIG. 10 are described herein below.

In the embodiment shown, the female connector portion 240 of the female connector 224 has an annular tab 240*c* extending circumferentially around the longitudinal axis L. The female connector portion 240 includes circumferentially spaced-apart protrusions 240*g* protruding radially outwardly from the annular tab 240*c* relative to the longitudinal axis L. A distribution of the protrusions 240*g* of the female connector portion 240 corresponds to a distribution of the slots 236*g* of the male connector portion 236 such that each of the protrusions 240*g* is slidably and removably receivable within a corresponding one of the slots 236*g*. In the embodiment shown, three slots 236*g* and three protrusions 240*g* are provided, but more or less than three slots and protrusions is contemplated. Any number of slots 236*g* and protrusions 240*g* may be used as long as the slots and grooves are distributed in an axisymmetric way. In other words, the groove of the male connector portion is non-axisymmetric because of the slots 236*g*. The tab 240*c* of the female connector portion is non-axisymmetric because of the protrusions 240*g*. A number of the slots correspond to a number of the protrusions.

In the embodiment shown, the protrusions 240*g* and the slots 236*g* of the female and male connector portions 240, 236 define a keyway engagement of the male and female connectors 222, 224. The male and female connectors 222, 224 are engageable in only one relative orientation. This may help prevent the female and male connectors 222, 224 from being incorrectly connected. Moreover, the protrusions 240*g*, and the slots 236*g* ensure that the central portions 36*c*, 40*f* of the male and female connector portions do not rub against one another and therefore prevent the first contacts 34, 134 from rubbing and damaging the central portion 40*f* of the female connector portion. Furthermore, the protrusions 240*g* and the slots 236*g* allow the male and female connector portions to be mated to one another solely in one orientation. This may add a safety feature to avoid a faulty connection.

Figure 17:
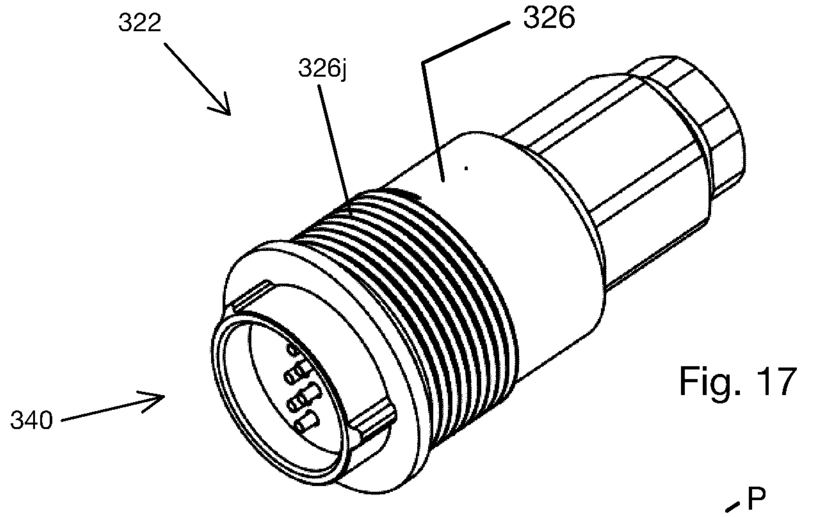
FIG. 17 is a three dimensional view of a female connector in accordance with another embodiment.
Figure 18:
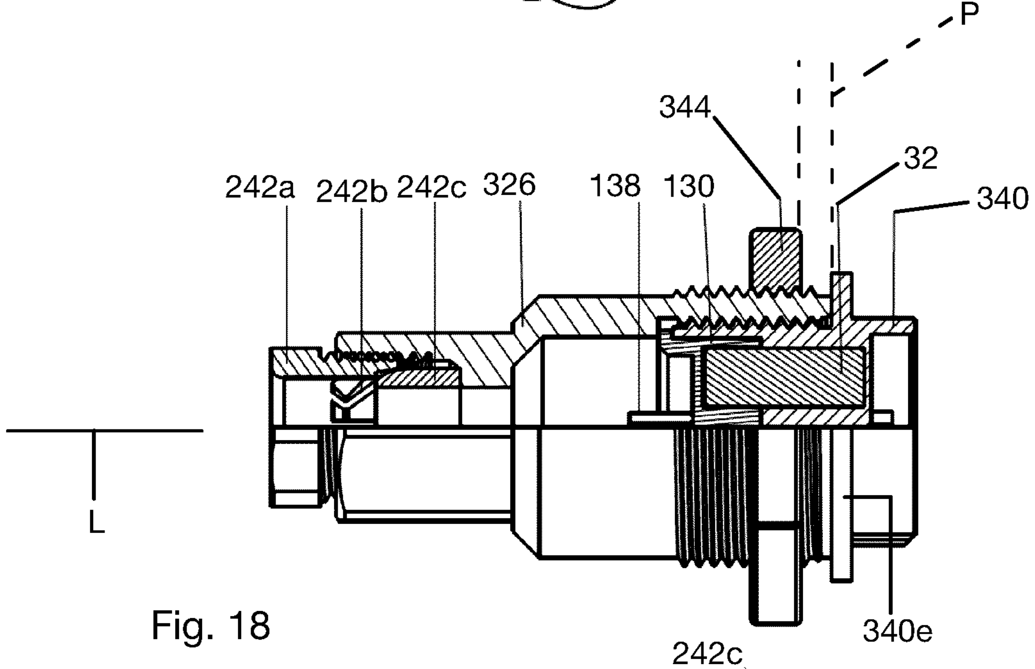
FIG. 18 is a side partial cut-away view of the female connector of FIG. 17.
Figure 19:
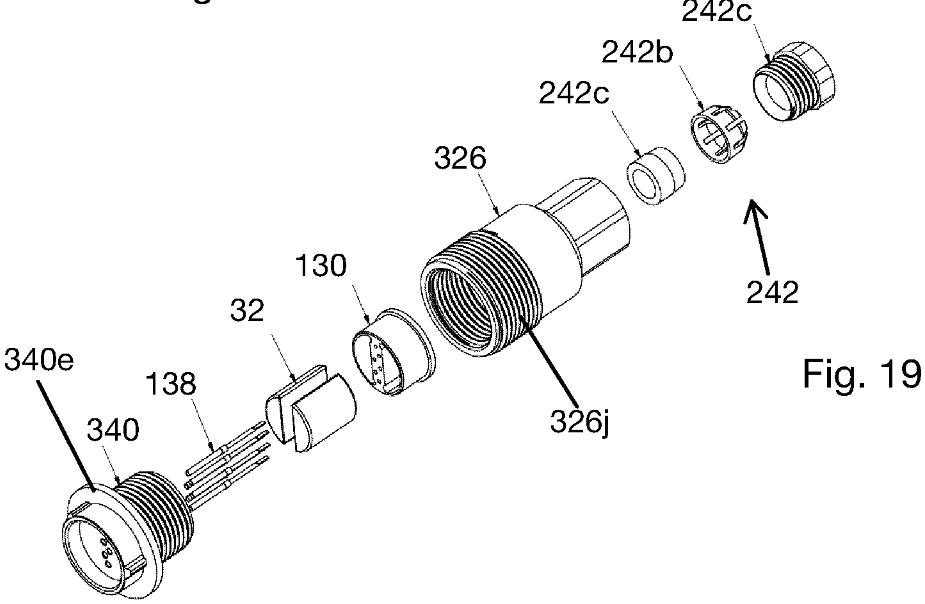
FIG. 19 is a three dimensional exploded view of the female connector of FIG. 17.

Referring now to FIGS. 17 to 19, another embodiment of female connector is shown at 324. For the sake of conciseness, only elements differing from the female connector 224 described above with reference to FIG. 16 are described below.

In the embodiment shown, the connector 324 is configured to be mounted to a panel P, which is shown in tiered line in FIG. 18. The connector 324 has a housing 326 defining outer threads 326*j* at the outer surface of the housing 326. Therefore, this connector 324 does not use the shell 28. A nut 344, which may be an hexagonal nut, is threadingly engaged to the outer threads 326*j* of the housing 326.

The female connector 324 includes a female connector portion 340 similar to the female connector portion 240 described above with reference to FIG. 16. In the embodiment shown, the female connector portion 340 includes a annular flange 340*e* extending circumferentially around the longitudinal axis L. The annular flange 340*e* protrudes radially outwardly relative to the longitudinal axis L beyond an outer diameter of the housing 326 to define an abutment face for the panel P.

As shown in FIG. 18, the female connector 324 may be installed on the panel P by inserting the housing 326 through a correspondingly sized aperture defined through the panel P until the annular flange 340*e* is in abutment against the panel P. The nut 344 may be threaded to the outer threads 326*j* of the housing 326 until the nut 344 is in abutment against the panel P. The nut 344 may be tightened to provide a secure attachment of the female connector 324 to the panel P. The panel P is therefore sandwiched between the nut 344 and the annular flange 340*e* of the female connector portion 340.

Figure 20:
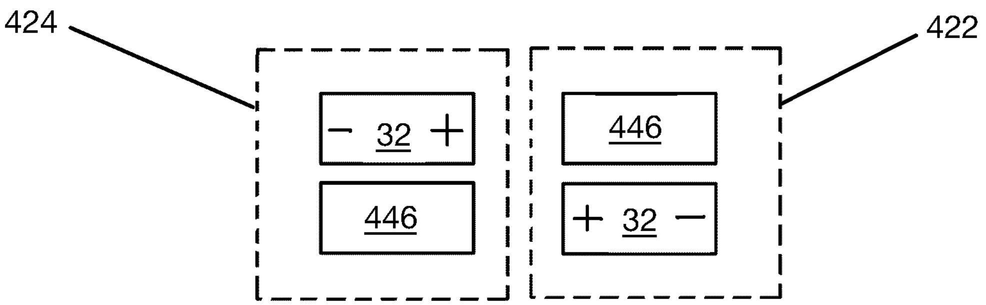
FIG. 20 is a schematic view of male and female connectors in accordance with an embodiment.

Referring now to FIG. 20, in an alternate embodiment, the female and male connectors 424, 422 include only one magnet each. The magnets 32 are disposed in a mirror like fashion such that, when the female and male connectors 424, 422 are in the wrong orientation, similar polarities (positive or negative) of the magnets 32 are facing each other, thereby preventing the user from connecting the connectors 422, 424. The remaining apertures 30*a* of the magnet holder 30 (FIG. 4) may each contain a magnetically attractable material 446 that is attractable by the magnets 32. As shown in FIG. 20, when the male and female connectors 422, 424 are properly aligned, they are attracted toward one another by each of the magnets 32 attracting a respective one of the magnetically attractable material 446. It will be appreciated that one of the apertures 30*a* of one of the magnet holders 30 of one of the male and female connectors 422, 424 may remain empty while the other one of the apertures 30*a* of the other one of the magnet holders 30 of the other one of the male and female connectors 422, 424 contains a magnetically attractable material.

Figure 21:
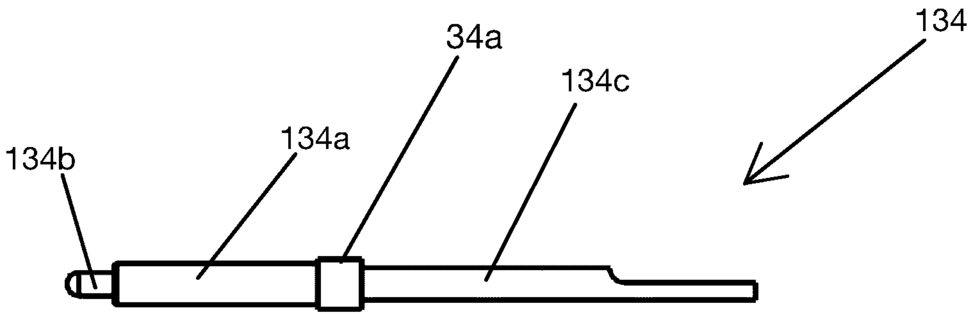
FIG. 21 is a schematic side view of an example contact used for the male connectors of FIGS. 8 and 13.

Referring now to FIG. 21, the first contacts 134 are described. In the embodiment shown, the first contacts 134 are Pogo™ pins. The first contact 134 includes a body 134*a* and a tip 134*b*. The tip 134*b* is movable within the body 134*a* and a spring is contained within the body 134*a* and used to bias the tip 134*b* outwardly. The first contact 134 has a connecting end 134*c* used for welding to wires of the cable C (FIG. 1). In the embodiment shown, the bodies 134*a* of the first contacts 134 are tight-fitted inside the apertures defined through the male connector portions. In some cases, for instance, when the connectors are used in a high temperature and high humidity environment, the contacts may use pins that do not contain springs. It will be appreciated that any contacts suitable for the operating conditions of the connectors may be used.

Figure 22:
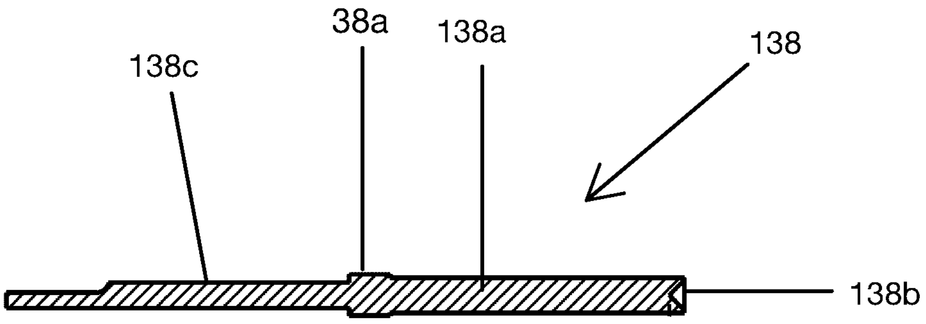
FIG. 22 is a schematic cross-sectional view of an example contact used for the female connectors of FIGS. 10, 16, and 17.

Referring now to FIG. 22, the second contacts 138 are described. The second contacts 138 are also from the Pogo™ family. The second contact 138 includes a body 138*a* defining a recess 138*b* at one of its extremities. The second contact 138 includes a connecting end 138*c* for welding to wires of the cable C (FIG. 1). In the embodiment shown, the bodies 138*a* of the second contacts 138 are tight-fitted inside the apertures defined through the female connector portions.

Referring to FIGS. 21 and 22, upon the male and female connectors engaging together, the pins 134*b* of the first contacts 134 are received within the recesses 138*b* of the second contacts 138 and the pins 134*b* are at least partially pushed inside the bodies 134*a* such that the pins 134*b* are biased against the second contacts 138, thereby electrically connecting the first contacts 134 to the second contacts 138.

It will be appreciated that the above description of the first and second contacts 134, 138 may apply to the first and second contacts 34, 38 of the male and female connectors 22, 24 of FIGS. 4 and 7. The contacts 34, 38 of the connectors 22, 24 of FIGS. 4 and 7 differ from the contacts 134, 138 by their size.

In the embodiment shown, each of the male and female connectors 22, 24 of FIGS. 2 and 5 differ from one another by their contacts 34, 38 and by their male and female connector portions 36, 40. The other components of the male and female connectors 22, 24 are the same. This may save costs from a manufacturing perspective. Similarly, in the embodiment shown, each of the male and female connectors 122, 124 of FIGS. 8 and 10 differ from one another by their contacts 134, 138 and by their male and female connector portions 136, 140. The other components of the male and female connectors 122, 124 are the same. This may save costs from a manufacturing perspective. In the embodiment shown, each of the male and female connectors 222, 224 of FIGS. 11 and 16 differ from one another by their contacts 134, 138 and by their male and female connector portions 236, 240. The other components of the male and female connectors 222, 224 are the same. This may save costs from a manufacturing perspective. It will be appreciated that other configurations are contemplated without departing from the scope of the present disclosure.

In a particular embodiment, the disclosed male and female connectors 22, 24, 122, 124, 222, 224, 324, 422, 424 provide a waterproof connection able to withstand wash-downs of the oven and provide a secure connection between the probe 10 and the controller 16 while the pieces of meat are cooking. The disclosed male and female connectors permit secure disconnection of the connectors when the cable C is pulled at a force greater than a given threshold. The materials used for said connectors may provide a high durability in harsh operating conditions. The disclosed connectors may not require frequent maintenance.

In the present embodiments, the housings, magnet holders, and connector portions are made of Teflon™, but any suitable material may be used. The shells are herein made of stainless steel, but any other suitable material may be used. The contacts are made of copper alloy. The sealing ring is made of silicone. The claw is made of nylon. Any suitable material may be used for these components. In the embodiments shown, the connectors are suitable to be used with about 48 volts in direct or alternative current at a current of about 1.5 amps. The magnets 32 are made of samarium-coblat. Any suitable magnet may be used.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A connector assembly for electrically connecting a first component to a second component, comprising:

a first connector having first contacts electrically connectable to the first component, and a first magnet secured to the first connector; and a second connector having second contacts electrically connectable to the second component, and a second magnet secured to the second connector, the first connector orientable relative to the second connector in a connecting orientation in which the first and second connectors are magnetically attracted to one another via one or both of the first and second magnets and in which the first contacts are electrically connected to the second contacts, and in a repelling orientation in which the first magnet is at least partially aligned with and repelling the second magnet for impeding connection between the first contacts and the second contacts, each of the first and second connectors having a respective one of a first connector portion and a second connector portion engageable together in a waterproof connection, the waterproof connection is defined by an engagement of an annular tab of the first connector portion within an annular groove of the second connector portion, the annular tab and the annular groove extending annularly around a longitudinal axis of the connector assembly, the annular tab and the annular groove extending around the first and second contacts.

2. The connector assembly of claim 1, wherein a retention force between the first and second connectors in the connecting orientation is about 10 pounds.

3. The connector assembly of claim 1, wherein the first contacts are aligned with the second contacts in both of the connecting orientation and the repelling orientation.

4. The connector assembly of claim 1, wherein the first connector has a first housing, a first magnet holder received within the first housing, and a first connector portion securable to the first housing, the second connector including a second housing, a second magnet holder received within the second housing, and a second connector portion securable to the second housing, the first housing having a shape identical to that of the second housing, the first magnet holder having a shape identical to that of the second magnet holder, the first connector portion different than the second connector portion.

5. The connector assembly of claim 1, wherein the first connector comprises a third magnet adjacent to the first magnet, the second connector comprising a fourth magnet adjacent to the second magnet, each of the first, second, third, and fourth magnets having a first end having a first polarity and a second end opposite the first end, the second end having a second polarity opposite the first polarity, the first polarity of the first magnet adjacent to the second polarity of the third magnet, the first polarity of the second magnet adjacent to the second polarity of the fourth magnet, the first and third magnets respectively aligned with the second and fourth magnets in the repelling orientation, the first and third magnets respectively aligned with the fourth and second magnets in the connecting orientation.

6. The connector assembly of claim 5, wherein the first contacts are disposed between the first and third magnets and wherein the second contacts are disposed between the second and fourth magnets.

7. The connector assembly of claim 1, wherein each of the first connector portion and the second connector portion has a central portion surrounded by a respective one of the annular tab and the annular groove, the central portion of the first connector portion in abutment against the central portion of the second connector portion when the first connector and the second connector are in the connecting orientation and when the annular tab is received within the annular groove.

8. The connector assembly of claim 7, wherein the first and second contacts are sealingly engaged to the first and second connector portions.

9. The connector assembly of claim 7, wherein the annular tab defines at least one protrusion, the annular groove defined between the central portion of the second connector portion and a peripheral wall extending around the central portion, the peripheral wall defining at least one slot, the at least one protrusion engaging the at least one slot solely in the connecting orientation.

10. A connector assembly for electrically connecting a first component to a second component, comprising:

a first connector having first contacts electrically connectable to the first component, and a first magnet secured to the first connector, the first connector having a first connector portion; and a second connector having second contacts electrically connectable to the second component, and a second magnet secured to the second connector, the second connector having a second connector portion engageable with the first connector portion, the first connector orientable relative to the second connector in a connecting orientation in which the first and second connectors are magnetically attracted to one another via one or both of the first and second magnets and in which the first contacts are electrically connected to the second contacts, and in a repelling orientation in which the first magnet is at least partially aligned with and repelling the second magnet for impeding connection between the first contacts and the second contacts, each of the first and second connectors has a housing secured to a respective one of the first and second connector portions, and a magnet holder located within the housing, the magnet holder defining magnet-receiving apertures, the first magnet received with one of the magnet-receiving apertures of the first connector, the second magnet received within one of the magnet-receiving apertures of the second connector.

11. The connector assembly of claim 10, wherein the magnet holder has a rib separating the magnet-receiving apertures, the first contacts received within contact-receiving apertures defined by the rib of the magnet holder of the first connector, the second contacts received within contact-receiving apertures defined by the rib of the magnet holder of the second connector.

12. The connector assembly of claim 11, wherein each of the first and second connector portions defines second magnet-receiving apertures separated by a second rib, the first magnet received with one of the second magnet-receiving apertures of the first connector portion, the second magnet received within one of the second magnet-receiving apertures of the second connector portion, the first contacts received within second contact-receiving apertures of the second rib of the first connector portion, the second contacts received within second contact-receiving apertures of the second rib of the second connector portion.

13. A connector forming part of a connector assembly for electrically connecting a first component to a second component, comprising:

a housing;

a magnet holder secured within the housing, the magnet holder defining magnet-receiving apertures separated from one another by a rib;

a connector portion secured to the housing and configured for engagement with another connector from the connector assembly;

contacts electrically connectable to the first component and secured to the connector portion, the contacts received within contact-receiving apertures defined through the rib of the magnet holder;

a first magnet received within the housing and received within a first one of the magnet-receiving apertures; and a second magnet received within the housing adjacent to the first magnet and received within a second one of the magnet-receiving apertures, each of the first and second magnets having a first end having a first polarity and a second end opposite the first end, the second end having a second polarity opposite the first polarity, the first polarity of the first magnet adjacent to the second polarity of the second magnet, the first and second magnets configured to attract the other connector in a first orientation and to repel the other connector in a second orientation.

14. The connector of claim 13, wherein the contacts are disposed between the first and second magnets.

15. The connector of claim 13, wherein the connector portion is engageable to the other connector in a waterproof connection.

16. The connector of claim 15, wherein the waterproof connection is defined by an engagement of an annular tab of one of the connector and the other connector and an annular groove of the other of the connector and the other connector.

17. The connector of claim 16, wherein the connector portion has a central portion surrounded by the annular tab or the annular groove, the central portion configured to abut against a central portion of the other connector when the annular tab is received within the annular groove.

* * * * *